United States Patent
Frind

(10) Patent No.: US 9,830,669 B1
(45) Date of Patent: *Nov. 28, 2017

(54) SYSTEM AND METHOD FOR ADAPTIVE MATCHING OF USER PROFILES BASED ON VIEWING AND CONTACT ACTIVITY FOR SOCIAL RELATIONSHIP SERVICES

(71) Applicant: PLENTYOFFISH MEDIA ULC, Vancouver (CA)

(72) Inventor: Markus Frind, Vancouver (CA)

(73) Assignee: PLENTYOFFISH MEDIA ULC, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/395,934

(22) Filed: Dec. 30, 2016

Related U.S. Application Data

(63) Continuation of application No. 12/488,512, filed on Jun. 19, 2009, now Pat. No. 9,536,221.

(60) Provisional application No. 61/074,142, filed on Jun. 19, 2008.

(51) Int. Cl.
*G06F 17/30* (2006.01)
*G06Q 50/00* (2012.01)

(52) U.S. Cl.
CPC ....... *G06Q 50/01* (2013.01); *G06F 17/30699* (2013.01)

(58) Field of Classification Search
None
See application file for complete search history.

(56) References Cited

U.S. PATENT DOCUMENTS

| | | | | |
|---|---|---|---|---|
| 6,134,532 A | * | 10/2000 | Lazarus | G06F 17/30867 705/1.1 |
| 6,735,568 B1 | * | 5/2004 | Buckwalter | G06Q 30/02 705/319 |
| 7,324,998 B2 | * | 1/2008 | Beres | G06F 17/30386 |
| 2005/0108227 A1 | * | 5/2005 | Russell-Falla | G06F 17/30867 |
| 2006/0059142 A1 | * | 3/2006 | Zvinyatskovsky | G06Q 30/08 |
| 2007/0005587 A1 | * | 1/2007 | Johnson | G06F 17/3053 |
| 2009/0216734 A1 | * | 8/2009 | Aghajanyan | G06F 17/30867 |
| 2010/0318544 A1 | * | 12/2010 | Nicolov | G06F 17/30035 707/759 |

\* cited by examiner

*Primary Examiner* — Amanda Willis
(74) *Attorney, Agent, or Firm* — Seed IP Law Group LLP

(57) ABSTRACT

A method and system which adaptively recommends potential relationships to individual users based on a set of items that are known to be of interest to the user, such as a set of potential matches previously messaged by the user. The system generates the adaptive recommendations using previously-generated user activity that indicates the user's preferences of particular attributes.

14 Claims, 4 Drawing Sheets

300

| Population Frequency | | |
|---|---|---|
| Attribute | Value | Frequency |
| Height > 5' 10" | YES | 60% |
| Smoker | NO | 70% |

310

| User Viewing and Contact Frequency | | |
|---|---|---|
| Attribute | Value | Frequency |
| Height > 5' 10" | YES | 80% |
| Smoker | NO | 60% |

320

| Weighted User Preference Factors | | |
|---|---|---|
| Attribute | User Freq. /Population | Weighting Factor (User/Pop. Freq − 1.00) |
| Height > 5' 10" | 80/60 | +0.33 |
| Smoker | 60/70 | −0.14 |

| Example Four User Population with Two Attributes | | |
|---|---|---|
| User | Height > 5' 10" | Smoker |
| User One | YES | NO |
| User Two | YES | YES |
| User Three | NO | NO |
| User Four | NO | YES |

410

| User Ranking Score Based on Weighted Values | | | | |
|---|---|---|---|---|
| User | Base Score | Height Score +/- 0.33 | Smoker Score +/- 0.14 | Total Score |
| User One | 100 | 0.33*100=33 | 0.14*100=14 | 147 |
| User Two | 100 | 0.33*100=33 | -0.14*100=-14 | 119 |
| User Three | 100 | -0.33*100=-33 | 0.14*100=14 | 86 |
| User Four | 100 | -0.33*100=-33 | -0.14*100=-14 | 53 |

FIGURE 4

SYSTEM AND METHOD FOR ADAPTIVE MATCHING OF USER PROFILES BASED ON VIEWING AND CONTACT ACTIVITY FOR SOCIAL RELATIONSHIP SERVICES

CROSS REFERENCE TO RELATED APPLICATIONS

This application claims the benefit of U.S. patent application No. 61/074,142, filed Jun. 19, 2008, the contents of which are hereby incorporated by reference.

FIELD OF THE INVENTION

The present invention relates to the field of online dating and social relationship services, and more particularly to a system and method of adaptively selecting and displaying potential user profile matches based upon a user's prior viewing and selection history.

BACKGROUND OF THE INVENTION

Online dating and social relationship services have become a popular way for individuals to meet and to begin relationships whether for friendship, romance, or the pursuit of shared interests. As Internet-based technology has evolved, so have the online dating services and social relationship services. What began as chat rooms and sometimes even as telephone-based services have evolved into more sophisticated services offering photographs, videos, highly detailed profiles and predictive compatibility tests all intended to allow a user to be matched more precisely with a set of potential new aquaintances or dates.

Unfortunately, the fault with these highly detailed profiles and with the search functions and predictive compatibility tests built upon them is contained in a simple truth: what people say they wish to do is not exactly what they will actually do and that the things that people say they want are not necessarily the things that these same people actually want.

On one particular dating site, www.plentyoffish.com, a complex variability has been observed between the desired characteristics of a potential match that a user will describe in completing a user survey and in the characteristics that exist within the profiles that the user actually chooses to view or select for further contact.

For example, in filling out a user survey, the user may indicate a preference for non-smokers, but in selecting profiles to view and users to contact, may not pay much attention to the attribute of smoking.

Conversely, a user may indicate in the user survey a preference for matches who are taller than 5'10" and then adhere to that criteria when selecting user profiles.

One facet of the problem in providing an optimal selection of user profiles based upon survey responses is that not all questions on an online dating or social relationship survey are meaningful or important to each user. Even if the survey would allow a user to specify an importance for each attribute, the user's estimation could still be in error. The observed activity of the user in relation to candidate user profiles, recorded over time, is a better measure of their actual preferences and predictor of their future preferences.

There exists then, a need for an online dating service or social relationship service where the selection of potential matches to be displayed to a particular user is adaptive to the actual interests and desires of that user based upon his or her actual viewing and contact history in addition to the interest and desire information originally reported and maintained in the user's profile.

SUMMARY OF THE INVENTION

In one aspect of the present invention, a computer-implemented method of matching a user of an social relationship service and a set of candidate user profiles for viewing and contact comprises providing a plurality of candidate user profiles to said user, recording said user's viewing and contact actions in relation to said candidate user profiles, correlating said user's viewing and contact actions to a plurality of user profile attribute values, identifying a second set of candidate user profiles based upon said correlated profile attribute values, and providing said second set of candidate user profiles to said user.

In a second aspect of the present invention, a computer-implemented method of determining the preferences of a user of a social relationship service for candidate user profiles based upon said user's viewing and contact histories comprises correlating said user's viewing and contact history to a plurality of user profile attribute values, calculating weighting factors for the importance of each user profile attribute; and using said correlated user preferences and said weighting factors to determine a total ranking score per candidate user profile; and retrieving and ordering said candidate user profiles from a data store based upon their ranking scores.

In a third aspect of the present invention, a computer-implemented method of selecting and displaying user profile records comprises correlating a user's viewing and selection-for-contact choices with a plurality of attribute values and querying user profile records within a data store based upon said plurality of attribute values.

In a fourth aspect of the present invention, a computer-implemented method of matching a user of an online dating service and a set of candidate user profiles for viewing and contact comprises providing a plurality of candidate user profiles to said user, recording said user's viewing and contact actions in relation to said candidate user profiles, correlating said user's viewing and contact actions to a plurality of user profile attribute values, identifying a second set of candidate user profiles based upon said correlated profile attribute values; and providing said second set of candidate user profiles to said user.

In a fifth aspect of the present invention, A computer-implemented method of matching a user of a social relationship service and a set of candidate user profiles for viewing and contact comprises providing a plurality of candidate user profiles to said user, recording said user's viewing and contact actions in relation to said candidate user profiles, correlating said user's viewing and contact actions to a plurality of user profile attribute values, identifying a second set of candidate user profiles based upon said correlated profile attribute values; and providing said second set of candidate user profiles to said user.

In a sixth aspect to the present invention, A computer-readable storage medium containing a set of instructions for a computer program comprises a display module for providing a plurality of candidate user profiles to said user, a recording module for recording said user's viewing and contact actions in relation to said candidate user profiles, a correlation module for correlating said user's viewing and contact actions to a plurality of user profile attribute values, and a query module for identifying and retreiving a second set of candidate user profiles from a data store based upon said correlated profile attribute values.

These and other features, aspects and advantages of the present invention will become better understood with reference to the following drawings, description and claims.

BRIEF DESCRIPTION OF THE DRAWINGS

FIG. 3 is an illustration of the use of population frequency and user viewing and contact frequencies to create weighting factors according to the present invention.

FIG. 4 is an illustration of the use of attribute occurrence and weighting factors to produce rankings of user profiles within a hypothetical example population.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
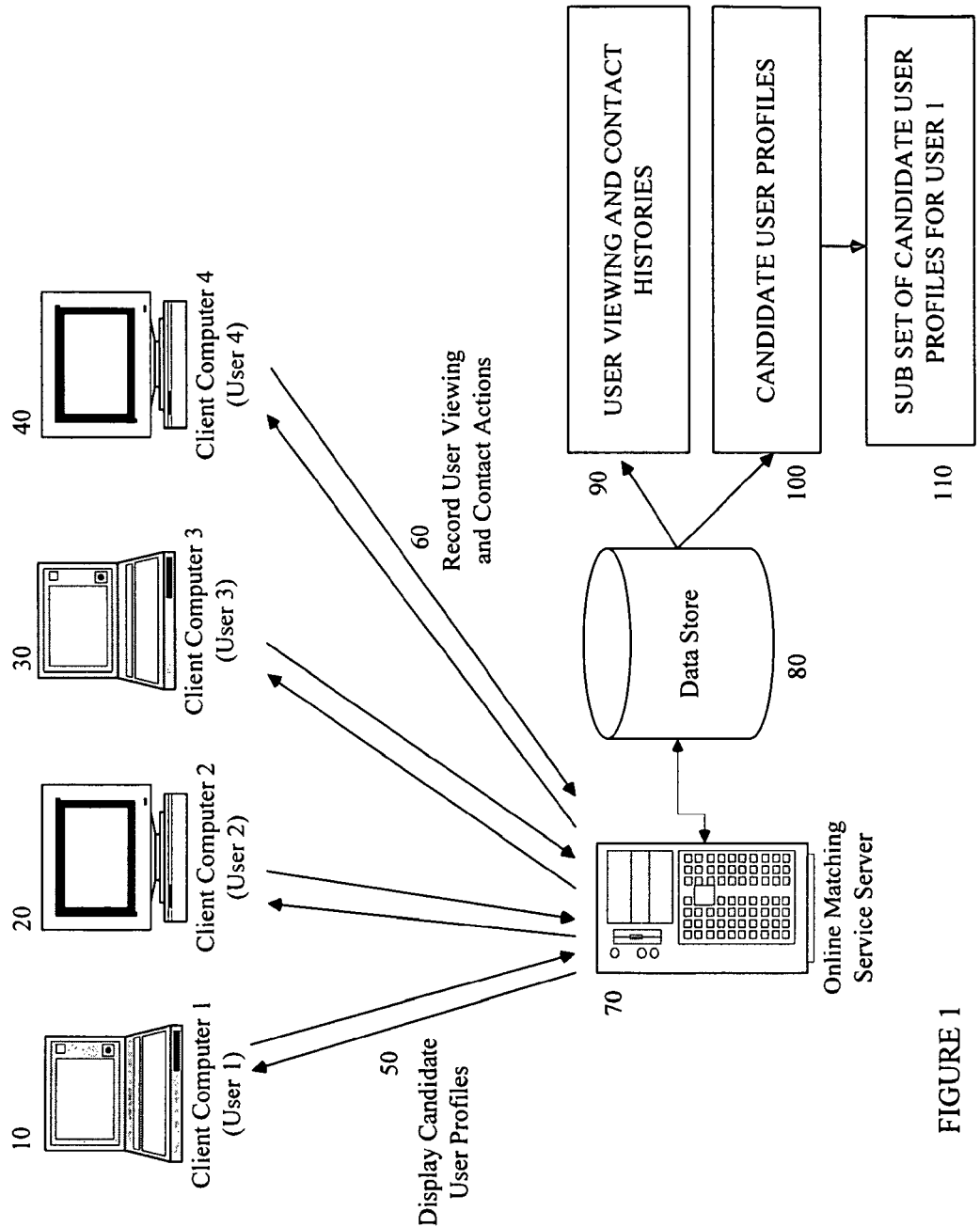
FIG. 1 is a system diagram illustrating the components of the user profile matching service according to the present invention.

In one embodiment of the invention, a social relationship service is implemented across a distributed network of computers. FIG. 1 illustrates a system diagram of such an embodiment.

The system includes a number of client computers 10, 20, 30, and 40, connected via network connections 50 and 60 to an online matching service server 70. This online matching service server 70 has access to a data store 80 in which are data set representing the user viewing and contact histories 90 of all users. In addition, the data store includes the candidate user profiles 100 of all users in the system. Candidate user profiles are any user profiles within the online matching service other than the user's own (though an exclusion of all user profiles not matching the user's gender preference are usually excluded).

In response to a user request on one the client computers 10, 20, 30 and 40, the online matching server and data store are capable of producing the sub set of candidate user profiles for a user 110, as shown.

Figure 2:
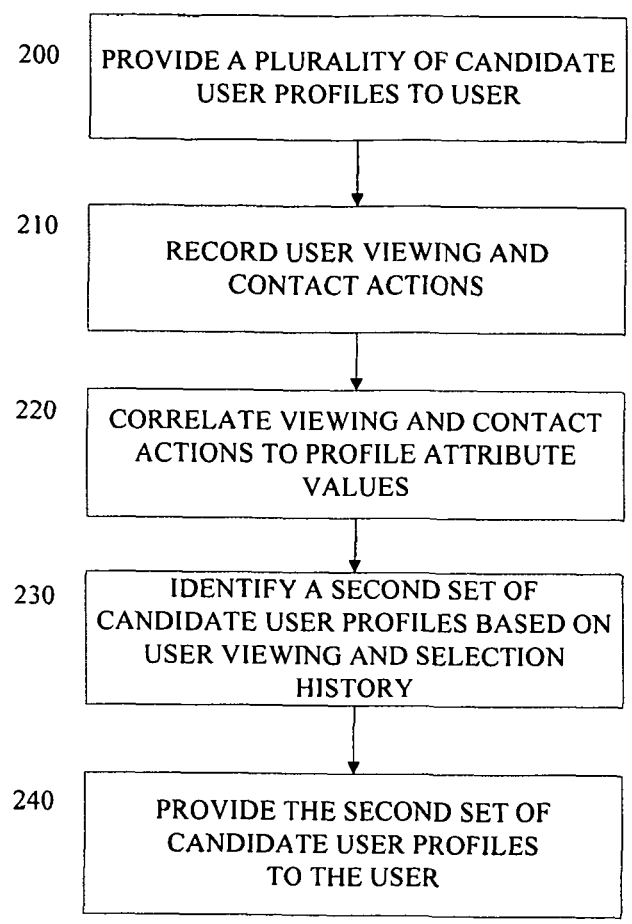
FIG. 2 is flow chart illustrating the user profile matching service according to the present invention.

FIG. 2 illustrates the steps in the process of the online matching service. The process begins by providing a plurality of candidate user profiles to the a user 200. Next, the user's viewing and contact actions are recorded 210 are then correlated to user profile attribute values 220.

Based upon the the user's viewing and selection history, a second set of candidate user profiles is identified 230 and then retrieved and provided to the user 240.

In a preferrred embodiment, the correlation of user factors to candidate user profiles is augmented by the use of weighting factors to represent the importance of the particular profile attribute to the user's selection of a profile for viewing or for contact. FIG. 3 provides an illustration of the process of calculating these weighting factors.

FIG. 3 shows three tables. The first table, the Population Frequency tabel 300, shows the frequency of values for two user profile attributes, "height over 5'10"" and "smoker" within the total population of candidate user profiles.

The second table, User Viewing and Contact Frequency 310, measures the frequency with which a user selected a user profile with that attribute value for viewing or chose to make contact with that user.

The third table, the Weighted User Preference Factors table 320, shows the calculation of a weighting factor for each user profile attribute based upon the ratio of user viewing and contact frequency to population frequency. In this example, the weighting factor is calculated by taking the ratio of the user viewing and contact frequency and dividing it by the population frequency of an attribute and then subtract the result from 1.0 to get a normalized result with either a positive or negative sign.

These weighting factors can then be applied to rank candidate user profiles and then to select and display candidate user profiles based upon rank.

FIG. 4 provides an example, using a hypothetical four user population of how to apply these weighting factors to small population of users for a small set of attributes and associated user preferences.

The first table 400 shows four users in a hypothetical user profile data store, Each of our candidate users possess two attributes: (Height >5'10) and whether a user is a smoker.

For purposes of this example, we assume that our user prefers to view and contact profiles of user's with Height >5'10 and also prefers non-smokers.

The second table, 410, shows the result of calculating a ranking score based upon the weighting factors previously calculate in table 320 from FIG. 3. Each user begins with a base score of 100. This score is then adjusted by taking each of the weighting factors and multiplying by the base factor. Lastly, if a candidate profile possesses an attribute, we shall represent it with a 1, and if not with a −1, causing the weighting factor to be positive or negative in this table.

For user one, who is a strong match for our user, we would calculate as follows:

(base score)+(height weighting factor*100*[−1 or 1 for attribute])+(smoker weighting factor*100* [−1 or 1 for attribute])=total score Yielding for user one:

100+0.33*100*1+−0.14*100*−1=100+33+14=147.

FIG. 4 shows the results of these calculations for each user in the candidate user profile pool 410.

The selection of user profiles may also, optionally be affected by two additional features of the adaptable matching system used to configure how quickly the system adapts and what level of randomness to seed into the user results.

The first of these factors, an adaptability factor, can be used to limit how quickly the matching engine adapts to the user's observed preferences. The easiest way to think about the utility of this factor is to return to our example of a user who has expressed a preference for non-smokers, but who may actually view and contact smokers as well as non-smokers.

Let us assume for purposes of example that our user has just signed up with our online service and has clicked on a single user profile before being pulled away from his or her computer to answer an incoming telephone call. Let us further assume the user profile viewed happened to be that of a smoker.

It turns out to be several hours before our user is able to return to the online service. As our user logs in, the question becomes, how many smokers and non-smokers should the matching engine select to display to the user? Based on our user's viewing and contact history, we see that our user has selected the profiles of smokers 100% of the time (the one single click after signing up with our service). It is undesirable to make a radical change in the selected set of user profiles (to show only smokers) on the basis of a single observation. It is useful, therefore, to have an adaptability factor, expressed as a number or a percentage that limits how quickly the system should adapt to changes in the user's observed preferences.

A second factor, a random sample percentage, provides a different function. It helps to preserve the ability of the system to continue to adapt once the user's observed preferences have been stable for some time. The random sample percentage is used to configure a guaranteed percentage of the user profiles that will be presented to the user that are randomly selected, or at least randomly selected on the basis of one or more attributes.

It should be understood, of course, that the foregoing relates to exemplary embodiments of the invention and that modifications may be made without departing from the spirit and scope of the invention as set forth in the following claims.

I claim:

1. A matching system to present a user of a social relationship service with respective ones of candidate user profiles for viewing and contact by the user, the matching system comprising:
at least one processor; and
at least one nontransitory computer-readable medium communicatively coupled to the at least one processor, wherein at least one nontransitory computer-readable medium stores a data store that includes a plurality of candidate user profiles, each of the plurality of candidate user profiles which includes a set of user-reported user profile attribute values (UUPAVs) that represent attributes reported by respective candidate users, and wherein the at least one nontransitory computer-readable medium further stores processor-executable instructions that specifically program the at least one processor to:
determine a population frequency for each of the UUPAVs in the set of UUPAVs, wherein the population frequency represents the frequency with which the UUPAV is present in the plurality of candidate user profiles;
provide a first set of the candidate user profiles to the user;
record in the at least one nontransitory computer-readable medium a number of viewing actions of the user, each of the number of viewing actions which represents a viewing of one of the candidate user profiles in the first set of the candidate user profiles by the user;
for each of the number of recorded viewing actions, record in the at least one nontransitory computer-readable medium whether each of the UUPAVs in the set of UUPAVs is present in each of the respective candidate user profiles in the first set of candidate user profiles viewed by the user;
record in the at least one nontransitory computer-readable medium a number of contact actions of the user, each of the number of contact actions which represents a contact between the user and respective ones of candidate users represented by the first set of candidate user profiles;
for each of the number of recorded contact actions, record in the at least one nontransitory computer-readable medium whether each of the UUPAVs in the set of UUPAVs is present in each of the respective candidate user profiles in the first set of candidate user profiles contacted by the user;
for each of the UUPAVs in the set of UUPAVs, determine a frequency for the UUPAV, the determined frequency which represents a frequency with which the user views candidate user profiles that have the UUPAV or contacts users that have the UUPAV;
for each of the UUPAVs in the set of UUPAVs, generate a weighting factor based at least in part on a comparison between the determined frequency of the UUPAV for the user and the determined population frequency for the same UUPAV,
wherein the weighting factor is negative when the determined frequency of the UUPAV for the user is less than the determined population frequency for the same UUPAV, and wherein the weighting factor is positive when the determined frequency of the UUPAV for the user is greater than the determined population frequency for the same UUPAV;
query the data store on behalf of the user for a second set of candidate user profiles based at least in part on the generated weighting factors for each of the UUPAVs in the set of UUPAVs; and
provide the second set of the candidate user profiles to the user.

2. The matching system of claim 1 wherein the processor-executable instructions that specifically program the at least one processor to record the number of viewing actions of the user and the number of contact actions of the user further specifically program the at least one processor to record the viewing and contact actions of the user across multiple browsing sessions.

3. The matching system of claim 1 wherein the processor-executable instructions that specifically program the at least one processor to record the number of viewing actions of the user and the number of contact actions of the user further specifically program the at least one processor to record the viewing and contact actions across an entire browsing history of the user.

4. The matching system of claim 1 wherein the processor-executable instructions that specifically program the at least one processor to provide the first set of the candidate user profiles to the user further specifically program the at least one processor to transmit the first set of the candidate user profiles over a distributed network of computers for display by a respective one of the computers which is operated by the user.

5. The matching system of claim 1 wherein the processor-executable instructions that specifically program the at least one processor to provide the second set of the candidate user profiles to the user further specifically program the at least one processor to transmit the second set of the candidate user profiles over a distributed network of computers for display by a respective one of the computers which is operated by the user.

6. The matching system of claim 1, wherein the processor-executable instructions further specifically program the at least one processor to:
make the social relationship service available across a distributed computer network.

7. The matching system of claim 1 wherein the social relationship service is an online business or professional networking service.

8. The matching system of claim 1, wherein the processor-executable instructions further specifically program the at least one processor to:
apply an adaptability factor to adjust how quickly the viewing and contact actions of the user affect the weighting factors used in querying the data store.

9. The matching system of claim 1, wherein the processor-executable instructions further specifically program the at least one processor to:
rank the second set of results by the at least one processor according to the generated weighting factors.

10. The matching system of claim 1 wherein the processor-executable instructions that specifically program the at least one processor to generate a weighting factor based at least in part on a comparison between the determined frequency of the selected UUPAV for the user and the determined population frequency for the selected UUPAV further specifically program the at least one processor to generate a weighting factor which is based at least in part on a ratio of the frequency to the population frequency.

11. The matching system of claim 10 wherein the processor-executable instructions that specifically program the at least one processor to generate a weighting factor which is based at least in part on a ratio of the frequency to the population frequency further specifically program the at least one processor to normalize the weighting factor.

12. The matching system of claim 1 wherein the second set of the candidate user profiles to the user excludes candidate user profiles not matching a gender preference of the user.

13. The matching system of claim 1 wherein the processor-executable instructions further specifically program the at least one processor to:
apply a random sample percentage to augment the second set of the candidate user profiles with a percentage of randomly selected candidate user profiles based on the random sample percentage.

14. A matching system to present a user of a social relationship service with respective ones of candidate user profiles for viewing and contact by the user, the matching system comprising:
at least one processor; and
at least one nontransitory computer-readable medium communicatively coupled to the at least one processor, wherein at least one nontransitory computer-readable medium stores a data store that includes a plurality of candidate user profiles, each of the plurality of candidate user profiles which includes a set of user-reported user profile attribute values (UUPAVs) that represent attributes reported by respective candidate users, and wherein the at least one nontransitory computer-readable medium further stores processor-executable instructions that specifically program the at least one processor to:
select at least some of the UUPAVs included in the plurality of candidate user profiles;
for each of the selected UUPAVs, determine a population frequency for each of the selected UUPAVs, wherein the population frequency represents the frequency with which the UUPAV is present in the plurality of candidate user profiles;
query the data store for a first set of the candidate user profiles on behalf of the user;
provide the first set of the candidate user profiles to the user;
record in the at least one nontransitory computer-readable medium a number of viewing actions of the user, each of the number of viewing actions which represent a viewing of one of the candidate user profiles in the first set of the candidate user profiles by the user;
for each of the number of recorded viewing actions, record in the at least one nontransitory computer-readable medium whether each of the selected UUPAVs is present in each of the respective candidate user profiles in the first set of candidate user profiles viewed by the user;
record in the at least one nontransitory computer-readable medium a number of contact actions of the user, each of the number of contact actions which represent a contact between the user and respective ones of candidate users represented by the first set of candidate user profiles;
for each of the number of recorded contact actions, record in the at least one nontransitory computer-readable medium whether each of the selected UUPAVs is present in each of the respective candidate user profiles in the first set of candidate user profiles contacted by the user;
for each of the selected UUPAVs, determine a frequency for the selected UUPAV, wherein the determined frequency represents a frequency with which the user views candidate user profiles that have the selected UUPAV or contacts users that have the selective UUPAV;
for each of the selected UUPAVs, generate a weighting factor for each selected UUPAV based at least in part on a comparison between the determined frequency of the selected UUPAVs for the user and the determined population frequency for the selected UUPAVs,
wherein the weighting factor is negative when the determined frequency of the UUPAV for the user is less than the determined population frequency for the same UUPAV, and wherein the weighting factor is positive when the determined frequency of the UUPAV for the user is greater than the determined population frequency for the same UUPAV;
query the data store on behalf of the user for a second set of candidate user profiles based at least in part on the generated weighting factors for the selected UUPAVs;
provide the second set of the candidate user profiles to the user; and
apply a random sample percentage to augment the second set of the candidate user profiles with a percentage of randomly selected candidate user profiles based on the random sample percentage.

* * * * *